(12) United States Patent
Bergvall et al.

(10) Patent No.: US 6,465,982 B1
(45) Date of Patent: Oct. 15, 2002

(54) ELECTRONIC SEARCH SYSTEM

(75) Inventors: Bengt-Allan Bergvall, Huskvarna; Ulf Petersson, Tollered, both of (SE)

(73) Assignee: Aktiebolaget Electrolux, Stockholm (SE)

( * ) Notice: Subject to any disclaimer, the term of this patent is extended or adjusted under 35 U.S.C. 154(b) by 0 days.

(21) Appl. No.: 09/582,892

(22) PCT Filed: Dec. 30, 1998

(86) PCT No.: PCT/SE98/02457

§ 371 (c)(1), (2), (4) Date: Jul. 6, 2000

(87) PCT Pub. No.: WO99/38056

PCT Pub. Date: Jul. 29, 1999

(30) Foreign Application Priority Data

Jan. 8, 1998 (SE) ............................................... 9800017
May 29, 1998 (SE) ............................................... 9801908

(51) Int. Cl.[7] ................................................ G05D 1/03
(52) U.S. Cl. ........................................ 318/587; 318/652
(58) Field of Search ................................. 318/580, 587, 318/606, 607, 647, 652; 180/167, 168

(56) References Cited

U.S. PATENT DOCUMENTS

| 3,550,714 A | | 12/1970 | Bellinger | |
| 3,757,887 A | * | 9/1973 | Moore et al. | 180/98 |
| 4,079,801 A | | 3/1978 | Dobson | |
| 4,613,804 A | * | 9/1986 | Swenson | 318/587 |
| 4,656,406 A | * | 4/1987 | Houskamp | 318/587 |
| 4,919,224 A | | 4/1990 | Shyu et al. | |
| 4,987,540 A | * | 1/1991 | Luke, Jr. | |
| 5,000,279 A | * | 3/1991 | Kondo et al. | 180/168 |
| 6,255,793 B1 | * | 7/2001 | Peless et al. | 318/580 |

FOREIGN PATENT DOCUMENTS

| EP | 0 774 702 A2 | 5/1997 |
| FR | 2 696 569 | 4/1994 |

* cited by examiner

*Primary Examiner*—Bentsu Ro
(74) *Attorney, Agent, or Firm*—Pearne & Gordon LLP

(57) ABSTRACT

A search system for a tool. A border cable separates inner and outer areas. A generator feeds the border cable with current, whose magnetic field affects a sensing unit on the tool, and the sensing unit emits signals to a control unit that directs the tool's motion. The current contains at least two components of different frequency. A search cable is placed within the inner area so that it separates a search area, and is fed by a signal generator with an adapted current (e.g., the current direction alternates to be either in phase or out of phase in relation to the current direction in the border cable) so that the magnetic fields in the different areas provide at least three patterns. Accordingly, the control unit can separate the inner, outer, and search areas.

28 Claims, 10 Drawing Sheets

```
Ia        + + + + + + + + + + +

Ib        - - - + - - - + - - - +
```

Signals 9
(tool) in
the area:

|  |  | Analogue levels |
|---|---|---|
| C | - - - - - - - - - - - | 0 % |
| A near a | + + + + + + + + + + + | 100 % |
| A between a and b | + + + ? + + + ? + + + ? | 75-100 % |
| A near b | + + + - + + + - + + + - | 75 % |
| B | - - - + - - - + - - - + | 25 % |

```
+ = in phase signal/in phase current
- = out of phase signal/out of phase current
```

Example of signification of analogue signal levels:

Signals 9
(tool) in
the area:

|  |  | Analogue levels |
|---|---|---|
| C | `- - - - - - - - - - -` | 0 % |
| A near a | `+ + + + + + + + + + +` | 100 % |
| A between a and b or d | `+ + ? + + ? + + ? + ?` | 67-100 % |
| A near b | `+ + - + + - + + - + -` | 67 % |
| B | `- - + - - + - - + - +` | 33 % |
| A near d | `+ + + + + - + + + + -` | 83 % |
| D | `- - - - - + - - - - +` | 17 % |

Example of signification of analogue signal levels:

$$< 8 \% = C$$

$$9\text{-}25 \% = D$$

$$26\text{-}49 \% = B$$

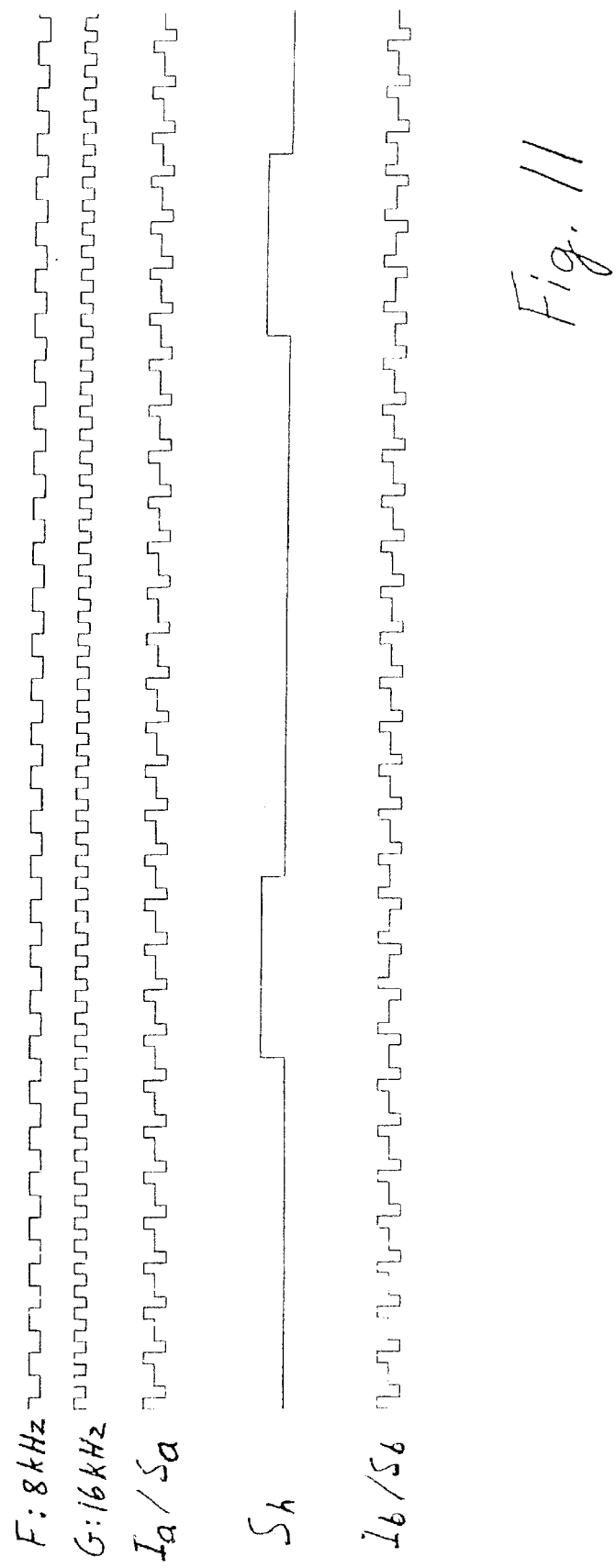

ELECTRONIC SEARCH SYSTEM

TECHNICAL FIELD

The subject invention refers to an electronic search system for a working tool, in which system a border cable, i.e. an electric cable, is placed above, under or on ground or floor, so that it separates an inner area within the border cable from an outer area, which working tool is preferably intended for attendance of ground or floor, such as grass-cutting, moss-scratching, watering, vacuum-cleaning, polishing, transportation etc., and a signal generator feeds the border cable with current, whose magnetic field affects at least one sensing unit located on the working tool, so that the sensing unit emits signals to a control unit, which in cooperation with an engine control, or a signal system for a driver, and at least one driving source directs the tool's movement in order to prevent it from remoting from the inner area.

BACKGROUND OF THE INVENTION

The idea to create a working tool, which manage completely by itself, such as a robot lawn mover or a robot vacuum-cleaner, is old. However, it has taken a long time before such kind of tool has reached the market. The solar cell driven lawn mover, called Solar Mower, is an example of that kind of product. It cuts the grass within a border cable, which has been placed in order to fence off the cutting area. Preferably the border cable is excavated into the ground. A signal generator feeds the border cable with current, whose magnetic field affects a sensing unit on the working tool. The sensing unit detects the intensity of the magnetic field and this intensity will increase when the working tool is coming closer and closer to the border cable. The microcomputer in the lawn mover is so programmed that the lawn mover reverses when a certain signal intensity has been achieved during the increasing of the signal intensity that occurs when the sensing unit is approaching the border cable. The lawn mover will as said move backwards from the border cable and then turn and begin to cut in a direction away from the border cable. Consequently, the lawn mover turns when the powerful magnetic field at the border cable has caused a signal intensity of a certain degree. On the other hand, the microcomputer cannot in any way separate the magnetic field on the outside from that on the inside of the border cable. It means that if the lawn mover should slide outside the border cable, or be pushed outside the border cable, the lawn mover will remote from the border cable in the wrong direction, i.e. out from the cutting area. However, it stops after approximately 4 meters when the signal intensity has dropped too much. These and other disadvantages are described in closer detail in a not yet published swedish patent application 9703399-7. This application refers to an electronic bordering system and describes in full detail the technology of how to separate an outer area from an inner area, thus essentially eliminating the above mentioned disadvantages. On the other hand, by way of this system no additional area within the inner area can be separated. For example, this would be desirable if you wish to cut a certain surface area especially carefully, or, if you wish that the tool shall stay within a certain area during the night. Also, it might be desirable to separate a special area for use in connection with a docking station for automatic battery charging.

PURPOSE OF THE INVENTION

The purpose of the subject invention is to substantially reduce the above outlined problems.

SUMMARY OF THE INVENTION

The above purpose is achieved in that the electronic search system in accordance with the invention is having the characteristics appearing from the appended claims.

The electronic search system in accordance with the invention is thus essentially characterized in that the first signal generator feeds the border cable with current containing at least two components of alternating-current with different frequency, and the components are lying in a known relation of time to each other, e.g. a regularly varying time relation, and that at least one more cable, called search cable, is placed at least partly within the inner area, so that it separates at least one search area within the inner area, and each search cable respectively is fed by a signal generator with an adapted current whose alternating-current components are virtually identical with the alternating-current components in the border cable, but where the direction of flow, at least for the alternating-current component with the higher frequency, in each of the search cables is alternating in time in being either in phase or out of phase in relation to the current flow direction in the border cable, so that the magnetic fields in the different areas, which are separated by each cable respectively, are forming at least three essentially unique time patterns, and hereby the control unit can evaluate the difference in the signals caused by the magnetic field's different time patterns in the inner area, the outer area and at least one search area, and the control unit can therefore emit an area signal, which mainly takes up one of at least three states depending on the position of the sensing unit in relation to the border cable or each search cable respectively, i.e. an outer area state, an inner area state or at least one search area state.

By means of the specific current that is fed onto the border cable, and by the adapted current that is fed onto one or several search cables, at least three different areas can be separated, i.e. an outer area, an inner area and at least one search area. Owing to the fact that at least one more area, called search area, is added comparing with the above mentioned electronic bordering system, a number of additional possibilities are created. One or several search area/s could for instance be cut especially carefully in that the cutting tool remains for a longer time within this/these certain area/s. The tool could stay in a certain search area during the night. By way of a special "follow the cable" mode the tool can move on along a search cable to a docking station for automatic battery charging.

The possibility for the control unit to evaluate if the sensing unit is located inside or outside the border cable is created in that the signal generator feeds the border cable with current containing at least two alternating-current components of different frequency, and in that the components are lying in a known relation of time to each other. Furthermore the frequences can preferably consist of multiples of each other, preferably equal number multiples of each other, and preferably the alternating-current components should stay in an essentially permanent time relation to each other. In order to increase the safety of the bordering system preferably an analogue signal is used, a so called quality signal, whose signal intensity is a measure of the intensity of the incoming signals of the control unit. Owing to this the tool can be shut off when the signal intensity is riskfully low. These and other characteristics and advantages of the invention will become more apparent from the detailed description of various embodiments with the support of the annexed drawing.

BRIEF DESCRIPTION OF THE DRAWING

The invention will be described in closer detail in the following by way of various embodiments thereof with reference to the accompanying drawing.

FIG. 4 shows schematically the currents fed to a border cable as well as to a search cable, and furthermore the signals picked up by the tool in the outer area, the inner area as well as in the search area. The search cable is fed with in phase and out of phase current according to a time-dependent pattern.

FIG. 5 corresponds to FIG. 4 but there is yet another search cable, which is electrically distinguished. The two search cables are fed with in phase and out of phase current with different time patterns.

FIG. 11 shows schematically some important signals and the currents in the signal generator with the cables according to FIG. 10.

DESCRIPTION OF EMBODIMENTS

Figure 1:
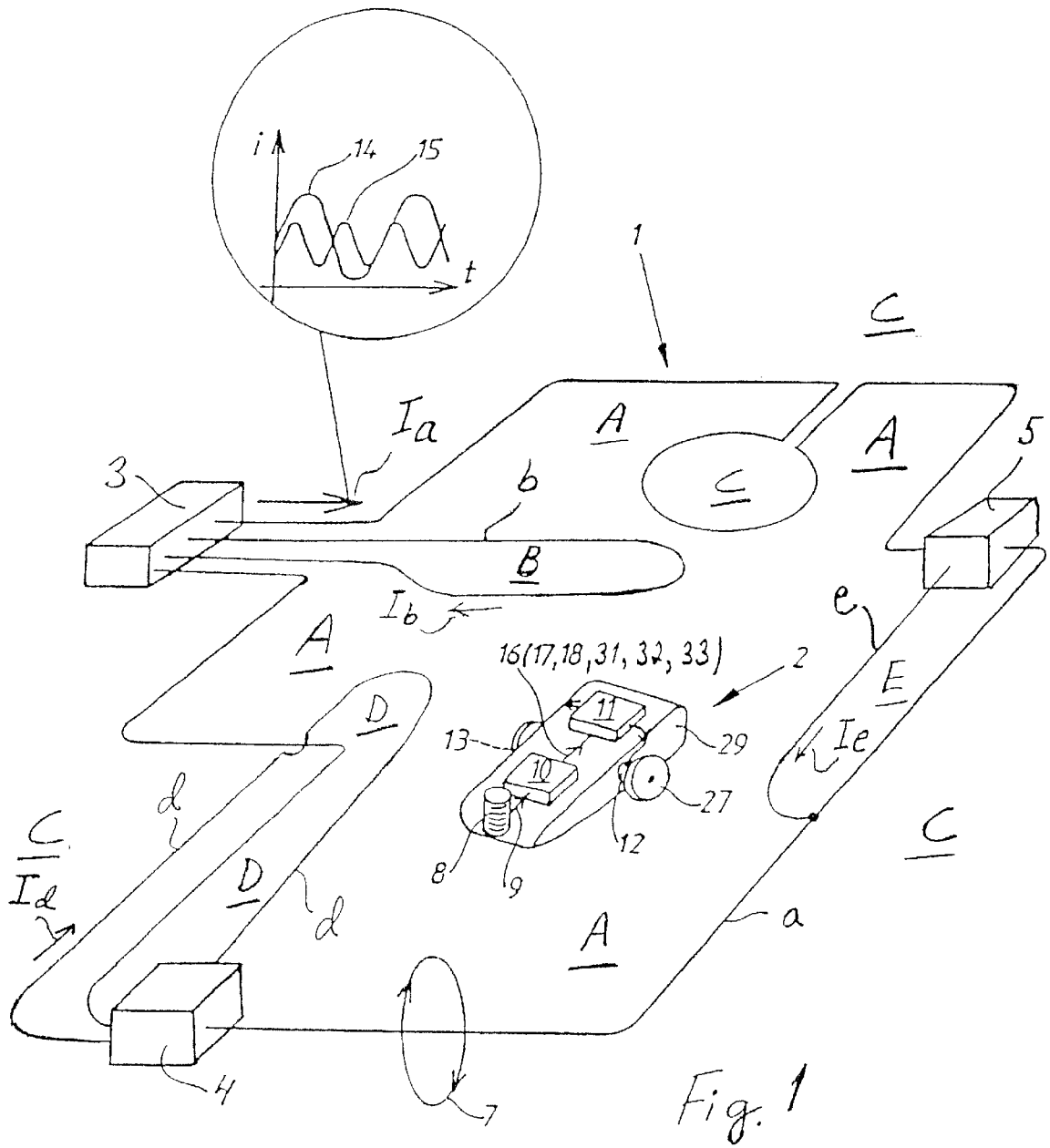
FIG. 1 shows in perspective a working tool, such as a lawn mover, placed on a lawn. By way of a border cable and a number of search cables the surface is devided into an outer area, an inner area and a number of search areas.

In the schematical FIG. 1 numeral reference 1 designates an electronic search system according to the invention. Numeral reference 2 designates a working tool. It is intended to be a lawn mover, which is shown somewhat enlarged, for the sake of clarity. For the same reason only the components which are of interest for the electronic search system are shown. The remaining components, such as a knife disc for example, are lying concealed under the tool's cover 29. The border cable a is in this case preferably placed a bit under the ground. In other applications, such as a vacuum-cleaner, or a floor-polishing machine, it could be placed on the floor, or above the floor, for example underneath the sealing. The border cable is an electric cable, such as a common copper wire of single-core type, but naturally also double-core type can be used. The border cable a is connected to a signal generator 3. The border cable separates an inner area A from an outer area C. The bordering area can have a comparatively arbitrary form. In the upper part of the figure an island C is shown. The border cable is thus placed there in order to protrude into the area A. The island could for instance be a round flower bed. The signal generator feeds the border cable a with current generating a magnetic field 7, which is shown here in only one position. The small diagram shows the current intensity as a function of time for the components 14 and 15. The current shall contain at least two alternating-current components 14, 15 of different frequency. In the shown example the component 15 has twice as high frequency as the component 14. The components are superposed a direct current component, which is not advatageous, but still quite possible. The components are lying in a known time relation to each other, in this case a permanent time relation. However, it could also be a regularly varying time relation. On the other hand it cannot be an accidentally varying time relation. The tool 2 rests on three wheels, of which two are rear wheels 27, 28. The front wheel is concealed under the cover 29 and is preferably a free-swinging link wheel. It means that the tool can be controlled in that each drive engine 12, 13 is driven in the suitable direction and with a suitable rotational speed. Naturally the tool could also be designed in other ways, e.g. it could be equipped with one driving wheel and two steering wheels. Normally the tool is self-propelled, but it is also conceivable that it is propelled by a driver.

Figure 8:
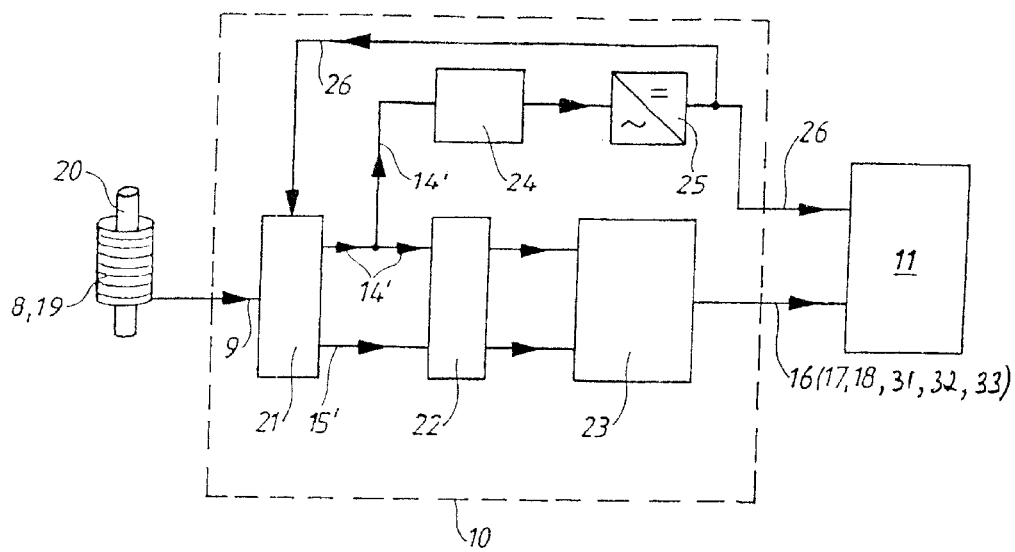
FIG. 8 shows enlarged the control unit 10, which is clearly evident without details from FIG. 1.

The tool is equipped with a sensing unit 8, here located on the one end, i.e. at the very front of the tool. The sensing unit comprises at least one coil 19. Preferably the coil 19 surrounds a ferrite rod 20, which is placed into the middle of the coil. The ferrite rod gives about 10 times amplification. The coil and the ferrite rod are shown in FIG. 8. The magnetic field 7 affects the sensing unit 8 so that it emits signals 9 to a control unit 10. The control unit 10 evaluates the signals 9 and emits an area signal 16 to an engine control 11. From the area signal 16 the engine control knows if the sensing unit is located within the inner area A or the outer area C or within at least one search area B, D, E. This is achieved in that the area signal 16 takes up one of at least three states depending on the position of the sensing unit 8 in relation to the border cable a or any one of the search cables b, d, e respectively, i.e. an outer area state 17, an inner area state 18 or at least one search area state 31, 32, 33. The engine control 11 provides the tool's driving engines 12, 13 with current for driving of the tool. Obviously the tool could also be run by an internal combustion engine. In the shown case the units 8, 10 and 11 are designed as separate units. But naturally they can be integrated into one or two units differently divided. In reality these units are of course placed under the cover 29. The engine control 11 could be replaced by a signal system for a driver, e.g. the signal system could by way of arrows indicate "turn left", "drive forward", "reverse", "turn right". This applies either in a case with a self-propelled working tool, which is the normal case, or in a case with a driver functioning as the driving source for propelling the tool.

Figure 2:
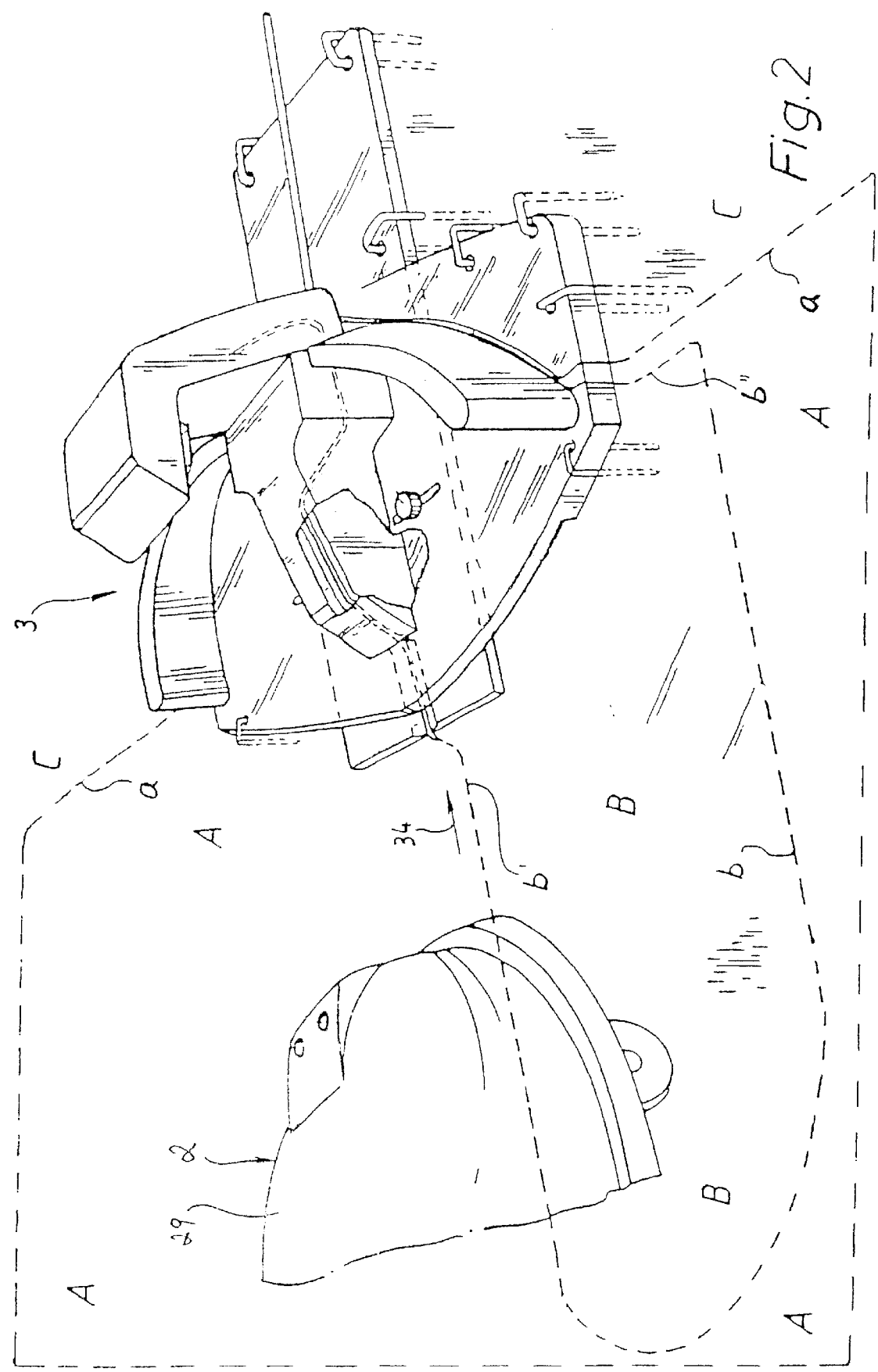
FIG. 2 shows in perspective a working tool, such as a lawn mover placed on a lawn, on its way towards a docking station. The working tool follows a search cable and only the front part of the tool is shown.

A number of search cables b, d, e are placed at least partly within the inner area A+B+D+E. Each search cable separates a search area B, D, E within the inner area. The search cable b is placed entirely within the inner area and is connected to the signal generator 3, to which also the border cable a is connected. In each search cable an adapted current Ib, Id, Ie is flowing. The adapted current in each search cable could either be the same as in the other search cables or it could be individual. If the current is identical in two or several search cables the tool interprets these as identical, and it is reasonable to arrange it so if they have the same function, such as battery charging. FIG. 2 shows in particular a docking station with a built-in signal generator. Its cable laying is in principle the same as that of signal generator 3, according to FIG. 1. For, the search cable b is placed entirely within the inner area. The search cable d for the signal generator 4 has been given a somewhat different laying. The search cable d is partly placed outside border cable a. Preferably the distance is so large that the magnetic field from border cable a is dominating the magnetic field from search cable d. Thereby the tool will stay essentially within the inner area on the inside of border cable a. When passing over to the "follow the cable" mode the tool will follow search cable d where this extends on the inside of border cable a. The signal generator 5 has a somewhat different arrangement of its search cable e. Search cable e is created by connecting a conductor e to the border cable a, so that a part of the border cable a will be integrated into search cable e, which separates the search area E. In this case it is important that the current in the border cable Ia is at least as strong as the current in search cable Ie, so that the tool senses the difference between the outer area C and the inner area E correctly. Accordingly, this solution offers shorter total length of cable but is more demanding from an electrical point of view. From an electrical point of view the most advantageous should be to place the search cable b essentially within the inner area A+B+D+E. The shown signal generators 3, 4, 5 are of two different types. The first signal generator 3 feeds the border cable with current Ia. The signal generator 3 can have a connected search cable b but must not necessarily. At least one second signal generator 4, 5 is placed at the border cable a and transmits an adapted current Id, Ie onto at least one search cable d, e. In that case the adapted current Id, Ie is preferably based on a sensing of the current Ia which the first signal generator 3 has transmitted to the border cable a. Hereby a synchronizing of the adapted current in relation to the current in the border cable can be made. Such synchronizing is advantageous but not necessary. The synchronizing could also be made in other ways.

FIG. 2 shows a signal generator 3 designed as a so called docking station for automatic battery-charging of a battery-operated tool 2. The signal generator 3 transmits current to a border cable a, which separates an inner area A+B. Furthermore it transmits an adapted current to the search cable b, which separates the search area B. This takes place in exactly the same way as earlier described. The docking system according to the figure is described in closer detail in a not yet published swedish patent application 9800017-7. The border cable a separates the ground area and is shown here on a substantially reduced scale from considerations of space. A signal generator feeds the border cable a with current containing at least two components of alternating-current with different frequency, and the components are lying in a known relation of time to each other. Hereby a control unit in the tool can evaluate the difference in signals from the sensing unit 8, caused by the magnetic field's different directions in the inner area A and the outer area C. It means that the tool can distinguish the inner area A from the outer area C and stay within the inner area. By way of the search cable a special area is now created, called search area B. This area is located within the inner area A. Preferably the signal generator feeds the search cable b with the same current containing at least two alternating-current components. During some part of the time the current in the both cables a and b are lying in phase with each other, i.e. in the same time relation, but during some part of the time the relation of time is changed so that they are lying out of phase with each other. In case the time proportions between the cables being in phase and being out of phase, or phase and anti-phase, are given a value differing from 50/50%, the average of the picked up signals in the sensing unit 8 can be distinguished between area A and area B. Particularly suitable proportions between the times of in phase and out of phase, or the times of phase and anti-phase, is one quarter and three quarters or one third and two thirds respectively. Consequently, by way of this system the areas A, B and C can be separated from each other. The system functions so that the control unit separates the different areas and not each cable a, b, as such.

The tool 2, usually a lawn mover, usually operates on the principle of random motion within the area A. It could also operate in a more systematic way. When its battery charge begins to run down it reacts in a special way when passing from area A to area B, or vice versa. The control unit takes note of the passage from area A to area B and the tool turns left with the intention of following the search cable b in a clockwise direction towards the docking station 3. In the opposite case, i.e. passage from area B to area A, the tool instead turns right with the intention of following the search cable in a clockwise direction. After this initial turn the tool will change over to a "follow the cable" mode as follows. After the tool has passed from area B to area A it turns immediately towards the opposite direction and moves back to area B and after moving from area A to area B it turns again and moves towards area A. This pattern will be repeated very frequently. The zigzag motion over the search cable b is hardly visible on a lawn, but the result will be that the cutting tool follows the search cable b in the desirable direction clockwise, so that it moves towards the docking station in the docking direction 34. Obviously the search cable b shall lie in the docking direction 34, at least the most adjacent part outside the docking station 3. Hereby is assured that the tool moves straight towards the station. Furthermore the search cable should be drawn over and above the station a suitable length, i.e. the first connecting part b', so that the tool follows the first connecting part b' on to the docking position. Since the tool is able to separate area A from area B it can also follow the search cable b in the desirable direction towards the station. Obviously, the search cable could as well be followed in an anti-clockwise direction, provided that the anti-clockwise connection, i.e. the second connecting part b" instead is drawn in the desirable docking direction 34. Furthermore, it might also be possible for the tool to stand still within the area B during a certain time of the day and night. The tool's microprocessor with a built-in clock is then simply programmed to stop within the area B when the tool arrives there during the relevant time. Consequently, the above described electronic search system does not imply any docking system, even if docking is the most common application. Obviously the search system could also be combined with other docking systems than the above mentioned.

Figure 3:
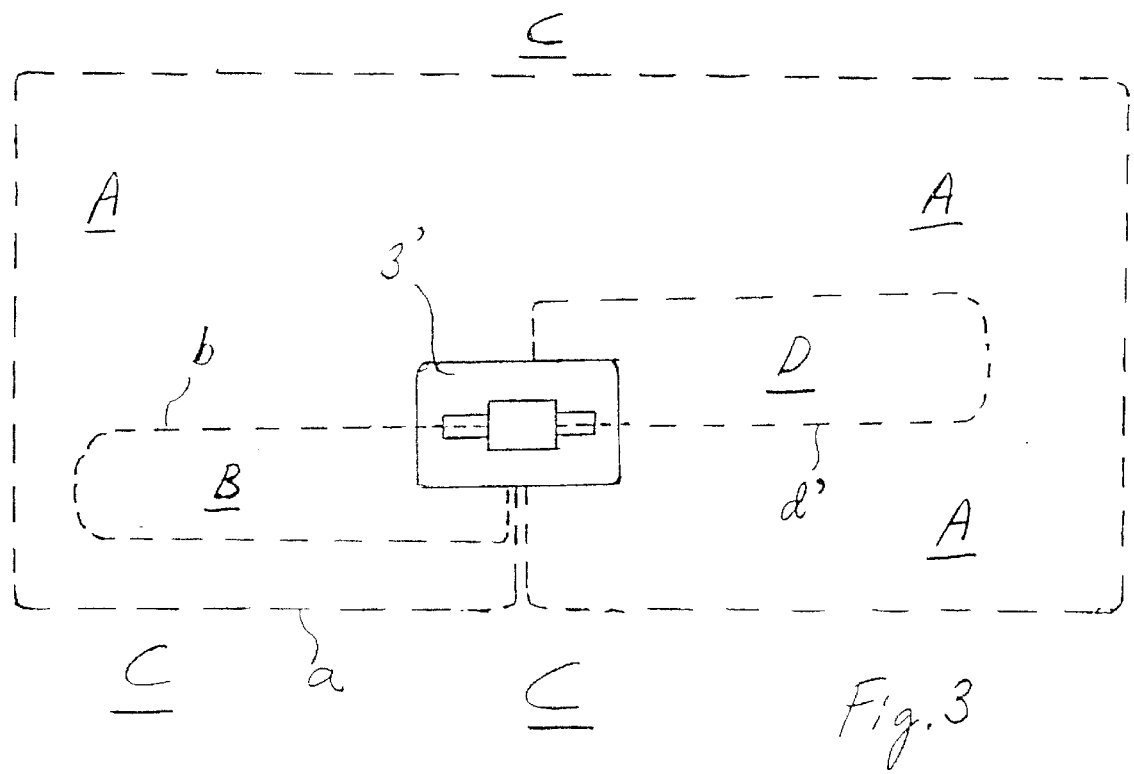
FIG. 3 shows straight from above a double docking station with two search cables connected.

However, the docking system can also be designed for several docking directions. Nearest to think of might be a double docking station with a second docking direction, which is quite the opposite one to docking direction 34. Such a system is shown in FIG. 3. In this case a second search cable d' should lead in the opposite direction in relation to the first search cable b. The system is primarily intended for battery-charging and a ramp is arranged in the opposite direction compared with the one shown in FIG. 2. This arrangement enables two working tools to be recharged at the same time in a double docking station. When a tool has followed one of the search cables, for example b', and is docking, preferably the current in this search cable b' is shut-off, so that no other tool is trying to recharge at the already occupied part of the docking station. Obviously the search areas b and d could also be used for other purposes than battery-charging. The adapted current in search cable b could be the same as in search cable d' but it could also be different depending on the purpose of each search area.

As mentioned, in the tool's 2 control unit there is a "follow the cable" mode, which becomes activated by passage from one area to another area in combination with that at least one more condition is fulfilled, e.g. the "follow the cable" mode becomes activated when a battery-operated tool gets a low voltage of battery (condition) and passes from the inner area over to the search area or vice versa, resulting in that the tool follows a search cable b; b, d', which leads to a docking station 3; 3' for automatic battery charging. In the "follow the cable" mode the state of the area signal 16 affects the engine control 11 so that the inner area state 18 guides the tool more to the right, while the search area state 31, 32, 33 guides the tool more to the left, so that the tool follows the search cable between the two areas clockwise, e.g. this applies for docking in a clockwise direction. Instead, for docking in an anti-clockwise direction the following procedure is applicable. In the "follow the cable" mode the state of the area signal 16 affects the engine control 11 so that the inner area state 18 guides the tool more to the left, while the search area state 31, 32, 33 guides the tool more to the right, so that the tool follows the search cable between the areas in an anti-clockwise direction. Obviously the "follow the cable" mode could also be used to follow the border cable a. But this implies usually a lot of problems for the tool since the border cable extends near flower beds, house walls and the like. The tool could also run the risk of getting caught at the island shown in the upper part of FIG. 1. Thus the tool would go round and round this island.

FIGS. 4 and 5 illustrate how the different areas can be separated from each other. The signs +, –, illustrate schematically the currents Ia, Ib in the cables and the signals in the areas A, B, C along an imaginary horizontal time axis, so that each sign +, –, ? corresponds to a unit of time. On top of the FIG. 4 the current Ia in the border cable a is shown. This is a current, whose phase position represents a reference phase. It is therefore per definition an in phase current, which is designated by a + sign. The current Ib in search cable b alternates in being either in phase or out of phase, where out of phase current is designated by a – sign. It means that at least the current direction of the alternating-current component 15 with the higher frequency alternates in being either in phase or out of phase in relation to the current direction in the border cable a. Also the alternating-current component 14 with the lower frequency can alternate in being either in phase or out of phase in the same way as the component 15, however, this alteration is not necessary for the system. Each current Ia, Ib individually generates magnetic fields 7 of a space varying intensity and direction. These magnetic fields' vertical components are added in every point in the three areas A, B, C, and will cause a resulting space dependent signal in the sensing unit 8. The signals 9, which are ermitted from the sensing unit 8 in the tool 2 will thus be either in phase signals or out of phase signals, or a combination of in phase and out of phase signals according to a special pattern. The in phase signal is designated by a + sign and the out of phase signal by a – sign. In the outer area C all signals per definition are out of phase signals, i.e. –. In the inner area A near the border cable a all signals are instead in phase signals, i.e. +. Thus we can see that the signs will be inverted when passing the border cable a. Since the border cable is fed with current Ia containing at least two alternating-current components of different frequency, and lying in a known relation of time to each other, the magnetic field's vertical direction on the inside as well as on the outside of the border cable a can therefore be sensed. And since the direction is different said inversion takes place. The corresponding matter of fact is also valid for the search cable b, i.e. an inversion of the signals occurs when passing the cable b. We can see that within area B the same signal pattern as there is in the current Ib can be sensed. Just outside search cable b in the area A these signals are instead inverted, so that we get three + signs and one – sign etc. instead of three – signs and one + sign. In the part of area A, which neither lies near border cable a nor search cable b the relation of signals is somewhat more uncertain. The two currents' Ia, Ib magnetic fields cancel each other out, so that only a weak resulting signal 9 is received in these areas. This is designated by a ? sign in the indefinite positions. It means that sometimes a + sign and sometimes a – sign is received where the ? sign is positioned. However, this implies no practical problems with the indication of each area respectively. In the column to the right, designated analogue levels, an analogue average value of the proportion of the in phase signals is shown, i.e. the proportion of the + signs in each line respectively. As for the center line, which is somewhat indefinite, the analogue level will thus be somewhere between 75–100%. At the bottom of the figure is shown an example of the signification of analogue signal levels. For, suitable signal levels can be programmed into the evaluation unit 23 in the control unit 10, which is used for this purpose. The signal levels can be chosen in many different ways and the example is showing a suitable method that offers large margins at each decipherment. Compare above column for analogue levels. Less than 12%, i.e. 12% of the + signs, are deciphered as area C. 13–49% are deciphered as area B and more than 50% are deciphered as area A. Consequently, in the evaluation unit the signals are deciphered as an analogue average of the proportion of in phase signals, or, as an analogue average of the proportion of out of phase signals, so that the evaluation unit creates the area signal 16. According to the example in FIG. 4 it takes up either an outer area state 17, an inner area state 18 or a search area state 31. The evaluation unit 23 can also sense the signals as a digital pattern of in phase and out of phase signals, and based upon this create the area signal 16. In FIG. 4 the proportions of time for in phase current and out of phase current is determined to be 25% respectively 75%, which is an advantageous choice. The proportions could as well be transposed, but this should be somewhat less advantageous.

FIG. 5 shows an example where the proportion of out of phase current in search cable b is 67% and the proportion of in phase current is approximately 33%. These values could also be transposed, which however would be less advantageous. In this case there is a further search cable d with current Id. In the example it has been given 83% out of phase current and 17% in phase current, corresponding to 5 – signs and 1 + sign and so on. Referring to FIG. 4 the same reasoning is valid also in this case when we look at the resulting signals 9 in the tool within the different areas and the resulting analogue levels. Also in this case the analogue levels refer to the proportion of in phase signals, i.e. + signals. Furthest down in the figure is shown an example of the signification of analogue signal levels, where less than 8%=outer area C, 9–25%=search area D,. 26–49%=search area B, more than 50%=area A. The evaluation unit creates the area signal 16 in the same way as earlier described. In this case it can take up an outer area state 17, an inner area state 18 or a search area state 31 or 32.

Figure 6:
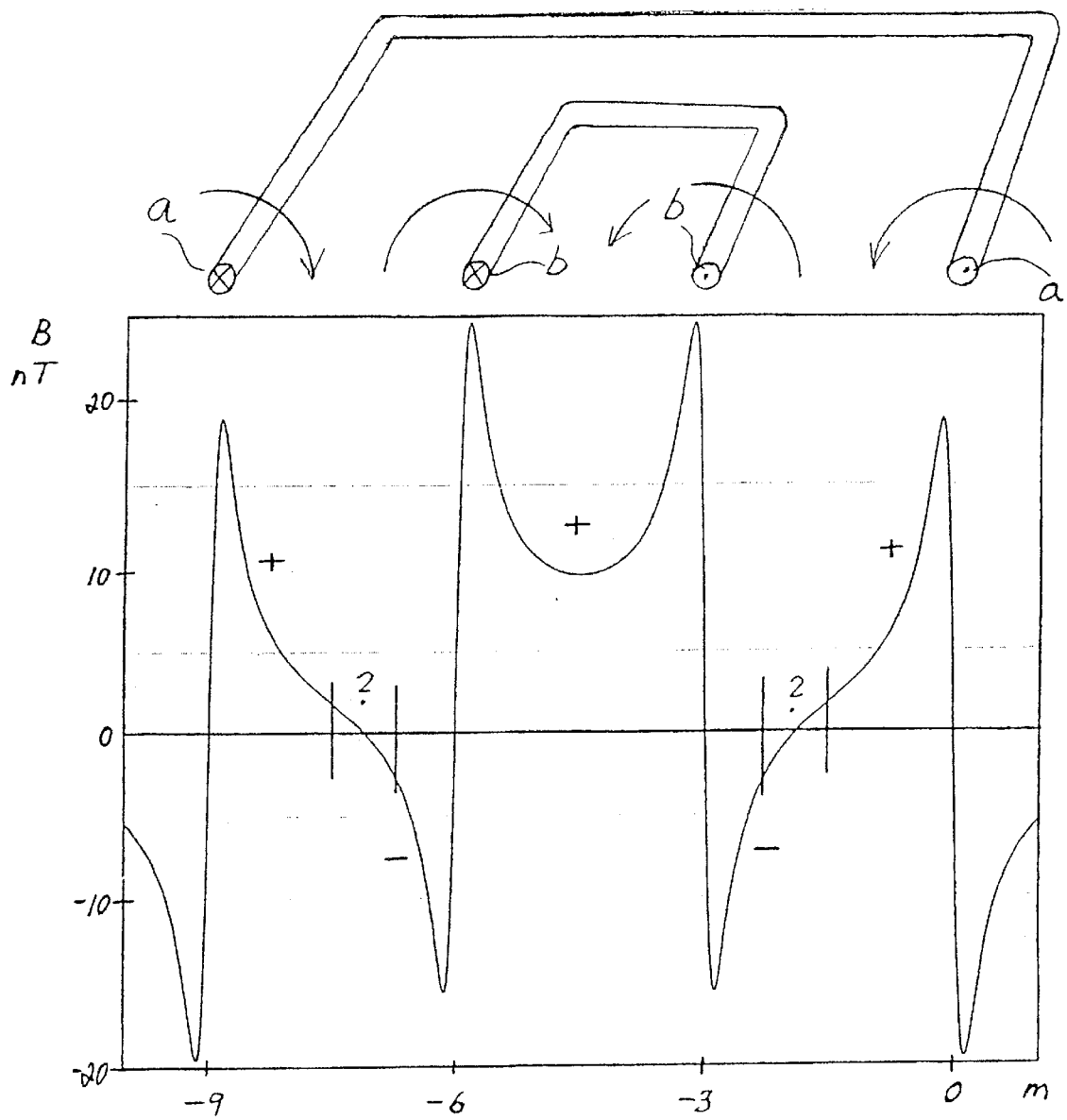
FIG. 6 shows on the vertical axis the vertical magnetic field around a border cable as well as a search cable on the inside of the border cable. In the upper part of the figure the conductors of each cable are shown. The diagram shows the vertical magnetic field when the current of the search cable is in phase with the current of the border cable.
Figure 7:
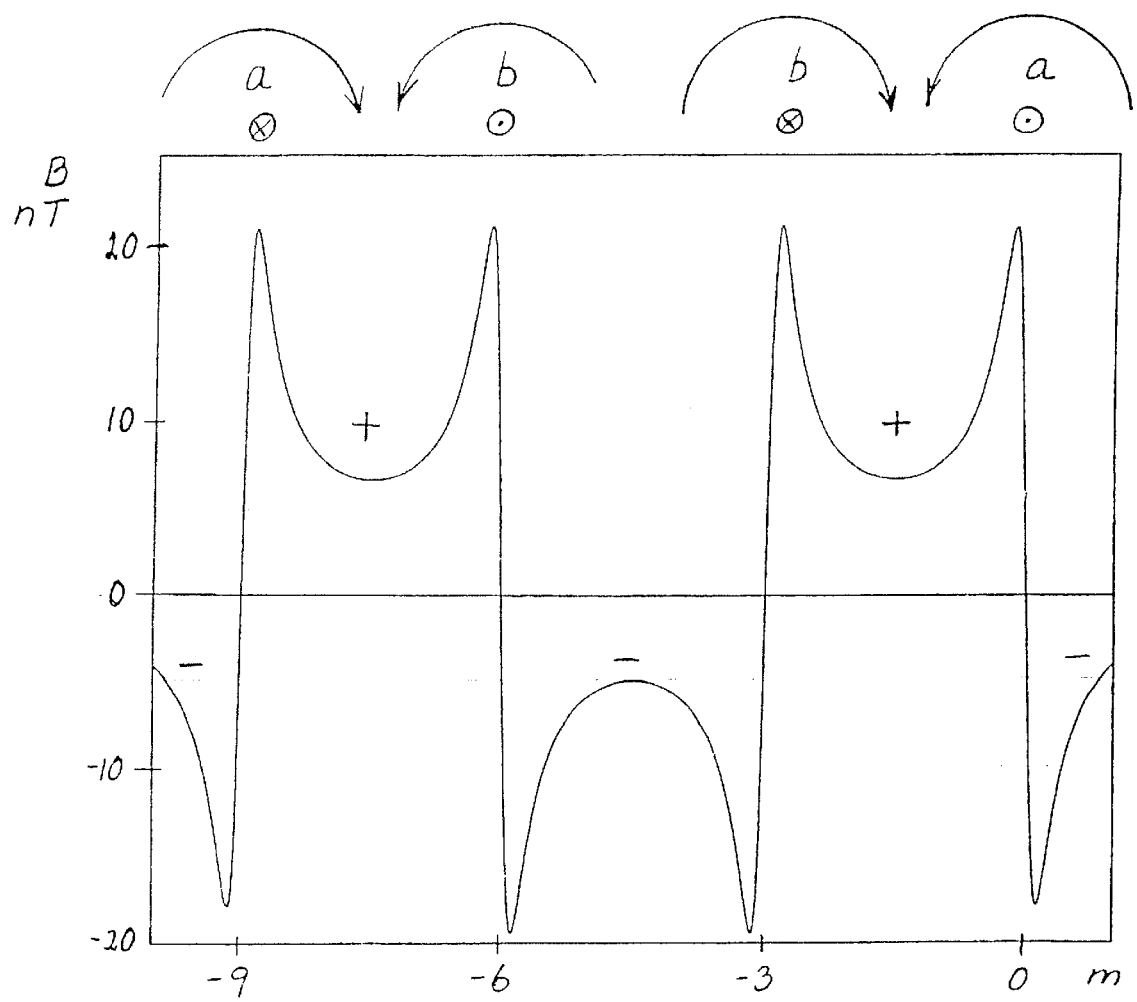
FIG. 7 corresponds to FIG. 6 but shows the vertical magnetic field when the current of the search cable is out of phase with the current of the border cable.

On top of the FIG. 6 the location of the border cable as well as the search cable becomes apparent and below there is shown a diagram in which the vertical axis illustrates the vertical magnetic field around each cable and the horizontal axis illustrates the distance between the cables. The FIG. 6 diagram illustrates the vertical magnetic field when the search cable is in phase with the border cable, and the FIG. 7 diagram illustrates the magnetic field when the search cable is out of phase. The diagrams refer to the magnetic fields at the illustrated cross-section of the cables. Also, at each cross-section is the designation of the cable and is the flow direction illustrated by a semicircular arrow. Hereby it becomes apparent if the flows strengthens or weakens each other and the resulting flow is given in each diagram. A positive vertical flow is marked by a + sign in the figure, and a negative flow by a – sign. In the areas where the flow is almost zero it is marked by a ? sign. These signs are the same as referred to in the FIGS. 4 and 5. FIG. 7 corresponds completely to FIG. 6 but shows the vertical flow when the search cable is out of phase with the border cable. By comparing FIG. 6 with FIG. 7, and compare with FIGS. 4 and 5, the function of the system becomes more apparent.

FIG. 8 shows more in detail how the signals from the sensing unit are processed in the control unit 10. It will also become apparent which signals are forwarded to the engine control 11. For, the purpose of the sensing unit is to detect at least two alternating-current components of different frequency, as mentioned by the examples given with 8 kHz and 16 kHz. It means that the coil 19 should have a resonance frequency lying in proximity to at least one of the frequences of the alternating-current components. Preferably a resonance frequency lying between the frequences of the components 14, 15 is chosen. In a test a coil with a copper wire around a ferrite core was used, and in sequence with the coil a capacitor was connected. Both components constitute a resonance circuit of approximately 11 kHz resonance frequency and a factor of merit, or Q-factor, of approximately 1,2. Thanks to the low factor of merit the coil is wide-banded, which is necessary for both frequences to come through. No trimming of the coil is required. Consequently, from the sensing unit a signal 9 is forwarded to the control unit 10. Initially the signal reaches a frequency divider 21, where it will be divided into at least two signal components 14', 15' with different frequency corresponding to the frequences of the alternating-current components 14, 15. After possible processing in a signal processing unit 22 the signal components are forwarded to an evaluation unit 23. The signal processing unit is used in order to give the signal components 14', 15' a more definite square form, and the need for this signal processing depends on the design of the evaluation unit 23. An example of an evaluation unit is a so called latch, which has a clock input and a data-in input. In this case the signal with the lower frequency 14' is connected to the clock input. It means that when the 8 kHz makes a positive pass through zero the signal component 15' will be released from the data-in input and go on to the data-out output and be kept fixed until a change occurs. This function is named "sample and hold". In an example the result will be that the outgoing area signal gets a certain voltage for in phase signals, while it gets another voltage for out of phase signals. Earlier is described how the evaluation unit 23, at least for the signal components 15' with the higher frequency, detects its signals, so that the evaluation unit creates the area signal 16. The sensing can occur either as an analogue average of the proportion of in phase signals or the proportion of out of phase signals, or as a sensing of a digital pattern of in phase and out of phase signals. Consequently, in this manner an area signal 16 is created, which takes up one of at least three distinct states, i.e. an outer area state 17, an inner area state 18 or at least one search area state 31, 32, 33. The above description is somewhat simply relating the basic function of the control unit 10 in one embodiment.

Figure 9:
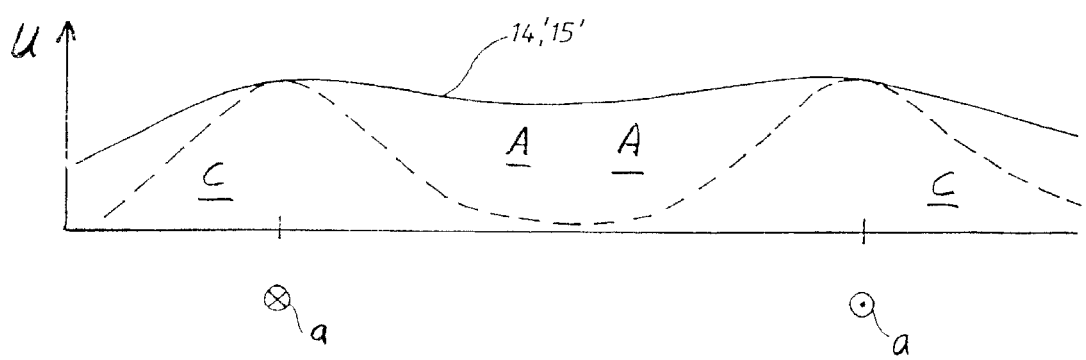
FIG. 9 shows the ground area as a horizontal line. The inner area is separated by a current supplied border cable. Above this the resulting signal intensity of the control unit is shown in two versions. A continuous-line illustrates the signal intensity when an automatically controlled amplifier according to FIG. 8 is used. A dash-dotted line illustrates the signal intensity when such an amplifier circuit is not used. The picture is simplified by showing only the absolute value of the signal intensity and not showing the extremely local fall of the signal intensity straight above each section of the border cable.

Furthermore, in the frequency divider 21 an amplification of the signal takes place, preferably in two resonance circuits, which i.a. consist of two trimable coils. During the amplification a certain degree of phase shift of each signal frequency can occur. This could mean that the signal frequences will not stay in the desirable permanent time relation to each other. Therefore, in the signal processing unit 22 an adjusting phase shift of each signal can be made, so that the desirable time relation between the signals is maintained. How much amplification the signal components 14', 15' need is varying depending on how far from the border cable the tool is located. It is therefore preferable to create a variable amplification, which is highest when the tool is located far from the cables and lowest when the tool is located near a cable. This is achieved in that one of the signal components, here 14', is forwarded to an amplifier 24, and after retifying in rectifier 25 the analogue amplifying signal 26 is brought back to the frequency divider 21, which also has a variable amplification. Compared with not having this special amplification circuit the amplifying signal 26 affects the variable amplification of the signals 14', 15', so that a considerably more constant signal intensity is achieved inside and close outside the inner area A. The described circuit serves as an amplifier with automatic gain control (AGC). In this circuit it is preferable that the amplifier 24 has non-linear amplifying so that its amplification can be non-linearly affected by the ingoing signal's intensity. In FIG. 9 is shown that the signal intensity U of the signals 14' and 15' according to the continuous-line varies very little within the inner area A and falls slowly out from the border cable in the outer area C. If this special amplification solution should not have been used, the signal intensity of the signals 14' and 15' would instead follow the dash-dotted line, which of course is much more disadvantageous.

In the middle of area A the relation between the signal intensities is such that the signal intensities according to the continuous-line are approximately 100 times stronger than those according to the dash-dotted line.

It is important that the tool shuts off itself in case of too low signal intensity. Since the evaluation unit 23 operates in a "digital" way this will not function automatically. Therefore a special quality signal 26 is created. In the shown example it is the same amplifying signal which is used in the amplification circuit. The analogue quality signal 26 has a signal intensity that is a measure of the intensity of the ingoing signals 9 to the control unit, so that the tool can be shut-off at a too low quality signal, i.e. too low signal intensity. The quality signal could also have been picked up directly from the ingoing signals 9 and then been rectified.

In another embodiment of the control unit 10 the picked up signals 9 from the sensing unit 8 can be analysed by way of a special software, so that signals from the inner area A can be separated from signals from the outer area C. Also in this case the supplied current in the border cable must contain at least two alternating-current components of different frequency having a known time relation. On the other hand the signals 9 must not be divided into signal components in a frequency divider 21. The "sum signal" can be analysed directly, preferably after a certain amplification is made. In this case the control unit 10 is relatively similar to the control unit shown in FIG. 8. As described earlier the signals 9 are amplified in the unit 21 but must not be divided into signal components 14', 15'. The best way to illustrate this is simply to cancel the signal 15' between the units 21 and 22 as well as the corresponding signal between the units 22 and 23 in FIG. 5. The evaluation unit 23 represents a microcomputer, or form part of a larger microcomputer, provided with a special software in order to analyse the incoming signals 14', which are amplified signals 9. For the analysis an analogue-digital-converter is used. By comparing the signal with stored data the evaluation unit can deternine if the sensing unit 8 is located in the inner area A or in the outer area C. Owing to the special current emitted to the border cable the signals from the inner area can be separated from the signals from the outer area. Preferably a digital signal processor (DSP) is used for this purpose. The units 22, 23, 24 and 25 could be parts in a DSP-unit. This DSP-unit could also be integrated into unit 11.

Figure 10:
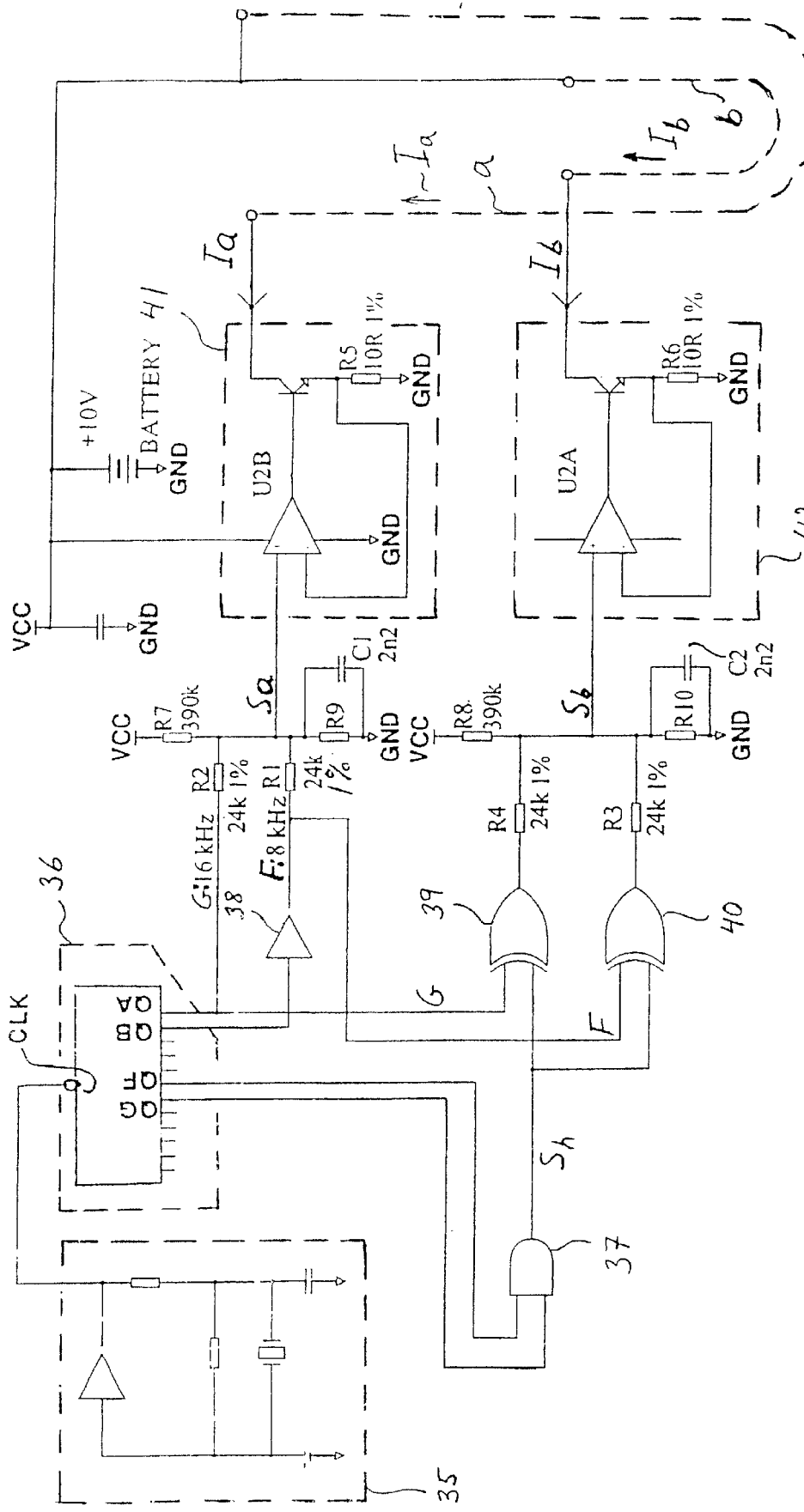
FIG. 10 shows somewhat simplified the electronic design of a signal generator, which feeds a border cable and a search cable with current.

FIG. 10 shows somewhat simplified the electric design of a signal generator which feeds a border cable and a search cable with current, and FIG. 11 shows some important signals and currents in the signal generator. The unit 35 shows an oscillator with a frequency of 32 KHz. This frequency is fed to a binary counter, i.e. unit 36, which divides the frequency, so that the highest frequency QA is 16 KHz and the next frequency QB is halved, i.e. 8 KHz. Both these are used in this case. Furthermore, two frequencies with considerably lower frequency QF and QG are used where QG is half the frequency of QF. The signal with the frequency of 8 KHz is conducted to a digital inverter 38, which creates a desirable curve-shape with plane, i.e. horizontal sections between the tops, compare FIG. 11. The signal is forwarded down to an EXCLUSIVE-OR-gate 40, and some part of it is forwarded to a resistance R1. The signal with the higher frequency is denominated G:16 KHz and is forwarded both to an EXCLUSIVE-OR-gate 39 and to a resistance R2. The component 37 is an AND-gate used for creating a phase inverting signal Sh. This is forwarded both to the component 39 and to the component 40. The phase inverting signal Sh has the appearance as shown in FIG. 11, where it has a higher level during a quarter of the time for inversion into out of phase, while the remaining three quarters has a lower level for in phase. Each frequency on their own is thus phase inverted in each component 39 and 40 respectively. This is due to the fact that each frequency signal in itself is binary and can be phase inverted, while a combination of both signals is trinary, and can not be treated in the same way. The phase inverting signal Sh could also be created from its own oscillator. This might be relevant in the example according to FIG. 5, however, it might be somewhat more complicated than in the shown one. By means of the resistances R1–R4 a conversion of each signal from digital to analogue form is achieved. The signal, which leaves the resistances R1 and R2, is thus of analogue form and can be put together into a border cable signal Sa. This signal is in voltage form and will be converted to current form in a voltage to current converter 41, so that the current Ia in the border cable is created. As illustrated in the figure the border cable a is included in a current circuit connected to a battery, here with 10 V output voltage. The circuit is closed via earth. The current in the border cable Ia is marked out in the figure. From each component 39 and 40 respectively comes signals, which are phase inverted by turns and having each a frequency component on their own. In the resistances R4 and R3 respectively a conversion of the signal from digital to analogue form takes place. Thereafter the two signals coming from R3 and R4 will be summed up into a search cable signal Sb. This signal is of voltage form but will be converted in a voltage to current converter 42 into current, so that the current lb in the search cable is created. These are the main features of the function of the signal generator, however, there are also some further built-in features, e.g. the resistances R9 and R10 are able to subdue deviation so that a voltage of 1 V in stead of 9 V is distributed. The capacitors C1 and C2 can round the square edges in the alternating-current components' sqare waves in order to reduce electric disturbances. Accepted designations are used for the different electric components in FIG. 10.

FIG. 11 shows thus some important signals and currents in the signal generator according to FIG. 10. On top of the figure is shown a signal F with the frequency of 8 KHz. There below is shown a signal G with the frequency of 16 KHz. Preferably these are lying in a permanent time relation to each other, as shown. There below is shown a summing-up of both above mentioned signals or currents, designated Ia/Sa, i.e. current in the border cable and the corresponding signal respectively in order to create the current flow. There below is shown a phase inverting signal Sh. The phase inverting signal Sh has two states; one state where no phase inversion occurs, which in this case is three quarters of the time, and another state used for phase inversion, in this case during one quarter of the time. By the phase inversion the curve-shape is changed so that the small positive "bump" comes up first in Ib compared with that it comes up last in Ia. To make the phase inversion during a part of the signal that is essentially horizontal is advantageous. In this example the phase inversion is thus thought to be made for the trinary signal Sa, while it in the real schedule according to FIG. 10 is made for each binary signal itself.

What is claimed is:

1. An electronic search system (1) for a working tool (2), in which system border cable (a) is placed above, under or on ground or floor, so that it separates an inner area (A) within the border cable (a) from an outer area (C), which working tool is intended for attendance of ground or floor, and a first signal generator (3; 3') feeds the border cable with current (Ia), whose magnetic field (7) affects at least one sensing unit (8) located on the working tool (2), so that the at least one sensing unit (8) emits signals (9) to a control unit (10), which in cooperation with an engine control (11), or a signal system for a driver, and at least one driving source (12, 13) directs the tool's motion in order to prevent it from remoting from the inner area (A), wherein the first signal generator feeds the border cable with current (Ia) containing at least two alternating-current components (14, 15) of different frequency, and the components (14, 15) are lying in a known relation of time to each other, and at least one more cable, called search cable (b, d, e) is placed at least partly within the inner area (A+B+D+E), so that it separates at least one search area (B, D, E) within the inner area, and each search cable (b, d, e) respectively is fed by a signal generator (3, 4, 5) with an adapted current (Ib, Id, Ie), whose altemating-current components (14, 15) are virtually identical with the altemating-current components in the border cable (a), but where the direction of flow, at least for the alternating-current component (15) with the higher frequency, in each one of the search cables is alternating in time in being either in phase or out of phase in relation to the current flow direction in the border cable (a), so that the magnetic fields in the different areas (A, B, C, D, E), which are separated by each cable respectively, are forming at least three essentially unique timer patterns, and hereby the control unit can evaluate the difference in the signals (9) caused by the magnetic field's different time patterns in the inner area (A), the outer area (C) and at least one search area (B, D, E), and the control unit can therefore emit an area signal (16), which mainly takes up one of at least three states depending on the position of the sensing unit (8) in relation to the border cable (a) or each search cable (b, d, e) respectively.

2. An electronic search system (1) according to claim 1, wherein the two alternating-current components' (14, 15) frequencies are multiples of each other.

3. An electronic search system (1) according to claim 2, wherein the two alternating-current components' (14, 15) frequencies are equal number multiples of each other.

4. An electronic search system according to claim 2 wherein the two alternating-current components' frequencies are selected from one of 8000 Hz and 16000 Hz; 8000 Hz and 24000 Hz; and 8000 Hz and 32000 Hz.

5. An electronic search system (1) according to claim 1, wherein the alternating-current components (14, 15) in the border cable (a) are lying in an essentially permanent time relation to each other.

6. An electronic search system (1) according to claim 1, wherein the alternating-current components are composed of square waves.

7. An electronic search system (1) according to claim 1, wherein each sensing unit comprises at least one coil (19).

8. An electronic search system (1) according to claim 1, wherein the control unit (10) evaluates the signals (9) by dividing them in a frequency divider (21) into signal components (14', 15') with different frequency corresponding to the frequencies of the alternating-current components (14, 15), and the signal components are forwarded to an evaluation unit (23), which at least for the signal component (15') with the higher frequency, detects its signals as an analogue average of the proportion of in phase signals, or the proportion of out of phase signals, so that the evaluation unit creates the area signal (16).

9. An electronic search system (1) according to claim 8 wherein at least one of the signals (9, 14', 15') is rectified in a rectifier (25) and is forwarded to the engine control (11) as an analogue signal, whose signal intensity is a measure of the intensity of the ingoing signals (9) to the control unit, so that the tool can be shut-off at a too low signal intensity.

10. An electronic search system (1) according to claim 8 wherein at least one of the signal components (14', 15') is forwarded to an amplifier (24), whose amplification thus is affected by the ingoing signal's (14', 15') intensity, and after rectifying in rectifier (25) the analogue signal (26) is brought back to the frequency divider (21), which also has a variable amplification, and compared with not having this special amplification circuit the signal (26) affects the variable amplification of the signals (14', 15'), so that a considerably more constant signal intensity in these signals (14', 15') is achieved inside and near outside the inner area (A+B+D+E).

11. An electronic search system according to claim 8, wherein the signal components are forwarded to an evaluation unit after processing in a signal processing unit.

12. An electronic search system (1) according to claim 8, wherein the evaluation unit is a latch.

13. An electronic search system (1) in accordance with claim 1, wherein the control unit (10) evaluates the signals (9) by dividing them in a frequency divider (21) into signal components (14', 15'), with different frequency, corresponding to the frequencies of the alternating-current components (14, 15), and the signal components are forwarded to an evaluation unit (23), which at least for the signal component (15') with the higher frequency, detects its signals as a digital pattern of in phase and out of phase signals, so that the evaluation unit can create the area signal (16).

14. An electronic search system (1) according to claim 13 wherein at least one of the signals (9, 14', 15') is rectified in a rectifier (25) and is forwarded to the engine control (11) as an analogue signal, whose signal intensity is a measure of the intensity of the ingoing signals (9) to the control unit, so that the tool can be shut-off at a too low signal intensity.

15. An electronic search system (1) according to claim 13 wherein at least one of the signal components (14', 15') is forwarded to an amplifier (24), whose amplification thus is affected by the ingoing signal's (14', 15') intensity, and after rectifying in rectifier (25) the analogue signal (26) is brought back to the frequency divider (21), which also has a variable amplification, and compared with not having this special amplification circuit the signal (26) affects the variable amplification of the signals (14', 15'), so that a considerably more constant signal intensity in these signals (14', 15') is achieved inside and near outside the inner area (A+B+D+E).

16. An electronic search system according to claim 13, wherein the signal components are forwarded to an evaluation unit after processing in a signal processing unit.

17. An electronic search system according to claim 13, wherein the evaluation unit is a latch.

18. An electronic search system (1) in accordance with claim 1, wherein the first signal generator (3; 3') transmits a current into a border cable (a) and in relation to the first current an adapted current into at least one search cable (b; b, d').

19. An electronic search system (1) according to claim 1, wherein the first signal generator (3) feeds the border cable (a) with current (Ia) and in that at least one second signal generator (4, 5) is located at the border cable (a) and transmits the adapted current (Id, Ie) into at least one search cable (d, e).

20. An electronic search system (1) according to claim 19, wherein the adapted current (Id, Ie) is based on a sensing of the current (Ia), which the first signal generator (3) has transmitted into the border cable (a).

21. An electronic search system (1) according to claim 1, wherein the at least one search cable (b, d, e) is located essentially within the inner area (A+B+D+E).

22. An electronic search system (1) according to claim 21, wherein the search cable (e) is created by connecting a conductor (e) to the border cable (a), so that a part of the border cable (a) will be integrated into the search cable (e), which separates the search area (E).

23. An electronic search system (1) according to claim 1, wherein the tool's (2) control unit there is a "follow the cable" mode, which becomes activated by passage from one area to another area in combination with that at least one more condition is fulfilled resulting in that the tool follows a search cable(b; b, d'), which leads to a docking station (3; 3') for automatic battery charging.

24. An electronic search system (1) according to claim 23, wherein in the "follow the cable" mode, the state of the area signal (16) affects the engine control (11) so that the inner area state (18) guides the tool more to the right, while the search area state (31, 32, 33) guides the tool more to the left, so that the tool follows the search cable between the two areas in a clockwise direction.

25. An electronic search system (1) according to claim 23, wherein, in the "follow the cable" modes the state of the area signal (16) affects the engine control (11) so that the inner area state (18) guides the tool more in the left, while the search area state (31, 32, 33) guides the tool more to the right, so that the tool follows the search cable between the two areas in an anti-clockwise direction.

26. An electronic search system according to claim 23, wherein the "follow the cable" mode becomes activated when a battery-operated tool gets a low voltage of battery (condition) and passes from one of the inner area and the search area to the other of the inner area and the search area.

27. An electronic search system according to claim 1 wherein said at least three states comprise an outer area state, an inner area state, and at least one search area state.

28. An electronic search system according to claim 1 wherein the work tool is used for one of grass-cutting, moss-scratching, watering, vacuum-cleaning, polishing, and transportation.

* * * * *

UNITED STATES PATENT AND TRADEMARK OFFICE
CERTIFICATE OF CORRECTION

PATENT NO.    : 6,465,982 B1
DATED         : October 15, 2002
INVENTOR(S)   : Bengt-Allan Bergvall et al.

It is certified that error appears in the above-identified patent and that said Letters Patent is hereby corrected as shown below:

Drawings,
Please delete sheet 4 of 10 containing Fig. 4, and insert therefor the attached page.
Please delete sheet 5 of 10 containing Fig. 5, and insert therefor the attached page.

Column 12,
Line 60, please delete "altemating", and insert therefor -- alternating --.

Signed and Sealed this

Eighteenth Day of March, 2003

JAMES E. ROGAN
*Director of the United States Patent and Trademark Office*

```
Ia     + + + + + + + + + + + +

Ib     - - - + - - - + - - - +
```

Signals 9
(tool) in
the area:

Analogue levels

```
     C     - - - - - - - - - - - -                    0 %

A     + + + + + + + + + + + +                  100 %
 near a

A     + + + ? + + + ? + + + ?                 75-100 %
between a and b

A     + + + - + + + - + + + -                   75 %
 near b

B     - - - + - - - + - - - +                   25 %
```

+ = in phase signal/in phase current

− = out of phase signal/out of phase current

Example of signification of analogue signal levels:

< 12 %    = C 13-49 %    = B

> 50 %    = A

Fig. 4

```
Ia    + + + + + + + + + + + +
Ib    - - + - - + - - + - - +
Id    - - - - - + - - - - - +
```

Signals 9
(tool) in
the area:

|  |  |  | Analogue levels |
|---|---|---|---|
| C | `- - - - - - - - - - - -` |  | 0 % |
| A near a | `+ + + + + + + + + + + +` |  | 100 % |
| A between a and b or d | `+ + ? + + ? + + ? + + ?` |  | 67-100 % |
| A near b | `+ + - + + - + + - + + -` |  | 67 % |
| B | `- - + - - + - - + - - +` |  | 33 % |
| A near d | `+ + + + + - + + + + + -` |  | 83 % |
| D | `- - - - - + - - - - - +` |  | 17 % |

Example of signification of analogue signal levels:

$$< 8\% = C$$

$$9\text{-}25\% = D$$

$$26\text{-}49\% = B$$

$$> 50\% = A$$

Fig. 5

UNITED STATES PATENT AND TRADEMARK OFFICE
CERTIFICATE OF CORRECTION

PATENT NO.    : 6,465,982 B1
DATED         : October 15, 2002
INVENTOR(S)   : Bengt-Allan Bergvall et al.

It is certified that error appears in the above-identified patent and that said Letters Patent is hereby corrected as shown below:

<u>Column 14,</u>
Line 66, please delete "modes", and insert therefor -- mode, --.

Signed and Sealed this

Twenty-second Day of April, 2003

JAMES E. ROGAN
*Director of the United States Patent and Trademark Office*